US011163815B2

(12) United States Patent
Chen et al.

(10) Patent No.: US 11,163,815 B2
(45) Date of Patent: Nov. 2, 2021

(54) METHOD FOR DYNAMICALLY PROCESSING AND PLAYING MULTIMEDIA CONTENTS AND MULTIMEDIA PLAY APPARATUS

(71) Applicant: Wistron Corporation, New Taipei (TW)

(72) Inventors: Chih-Ming Chen, New Taipei (TW); Yen-Chuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/546,321

(22) Filed: Aug. 21, 2019

(65) Prior Publication Data

US 2020/0380025 A1    Dec. 3, 2020

(30) Foreign Application Priority Data

Jun. 3, 2019   (TW) .................................. 108119190

(51) Int. Cl.
    *G06F 16/43*   (2019.01)
    *G06F 16/438*  (2019.01)
    *G06F 16/28*   (2019.01)
    *G06F 16/435*  (2019.01)

(52) U.S. Cl.
    CPC ........ *G06F 16/4393* (2019.01); *G06F 16/282* (2019.01); *G06F 16/284* (2019.01); *G06F 16/435* (2019.01)

(58) Field of Classification Search
    CPC .. G06F 16/4393; G06F 16/435; G06F 16/284; G06F 16/282

USPC ........................................................ 715/202
See application file for complete search history.

(56) References Cited

U.S. PATENT DOCUMENTS

| 8,666,910 | B2  |   | 3/2014 | Chen et al. |             |
|-----------|-----|---|--------|-------------|-------------|
| 9,418,111 | B1  | * | 8/2016 | de Moor ....... | G06F 16/244 |
| 10,360,925| B2  | * | 7/2019 | Basson ......... | G10L 25/27  |
| 10,564,991| B2  | * | 2/2020 | Kotlicki ....... | G06F 3/167  |
| 2003/0065659 | A1 | * | 4/2003 | Agarwal ..... | G06F 16/86  |

(Continued)

FOREIGN PATENT DOCUMENTS

| CN | 104287747 | 1/2015  |
| CN | 107392151 | 11/2017 |
| TW | 201022968 | 6/2010  |

OTHER PUBLICATIONS

"Permutation;" Apr. 2, 2019; Cambridge English Dictionary Online; pp. 1-8.*

(Continued)

Primary Examiner — Andrew R Dyer
(74) Attorney, Agent, or Firm — JCIPRNET

(57) ABSTRACT

A method for dynamically processing and playing multimedia contents and a multimedia play apparatus are provided. A topic map is generated based on a title. The topic map has a plurality of nodes, and each node corresponds to one of the multimedia contents. Multiple node groups are obtained through permutation and combination of these nodes. A target group that matches a constraint is found among these node groups. A play order of each node in the target group is determined according to at least one reward table. One or more multimedia contents included in the target group are processed and played according to the play order.

18 Claims, 6 Drawing Sheets

(56) References Cited

U.S. PATENT DOCUMENTS

| | | | |
|---|---|---|---|
| 2004/0015386 A1* | 1/2004 | Abe | G06Q 30/0234 |
| | | | 705/7.29 |
| 2010/0094957 A1* | 4/2010 | Zuckerman | H04L 67/1002 |
| | | | 709/219 |
| 2010/0145892 A1 | 6/2010 | Yang et al. | |
| 2010/0309436 A1* | 12/2010 | Allen, Jr. | G06Q 10/10 |
| | | | 353/21 |
| 2011/0065082 A1* | 3/2011 | Gal | G09B 7/02 |
| | | | 434/365 |
| 2011/0115799 A1* | 5/2011 | Imbruce | G06F 3/0482 |
| | | | 345/473 |
| 2013/0080348 A1* | 3/2013 | Pantaliano | H04H 60/66 |
| | | | 705/347 |
| 2013/0252222 A1* | 9/2013 | Fox | G06Q 30/02 |
| | | | 434/350 |
| 2013/0325768 A1* | 12/2013 | Sinyavskiy | G06N 3/049 |
| | | | 706/16 |
| 2015/0006680 A1* | 1/2015 | Chen | H04L 65/4076 |
| | | | 709/219 |
| 2015/0281250 A1* | 10/2015 | Miller | G06F 16/4393 |
| | | | 726/1 |
| 2015/0293914 A1* | 10/2015 | Liu | G06F 16/41 |
| | | | 709/219 |
| 2016/0034260 A1* | 2/2016 | Ristock | G06F 9/453 |
| | | | 717/109 |
| 2016/0154860 A1* | 6/2016 | Bender | G06F 16/248 |
| | | | 707/754 |
| 2017/0060857 A1* | 3/2017 | Imbruce | H04L 67/02 |
| 2017/0302679 A1* | 10/2017 | Caramico | H04L 67/306 |
| 2018/0101776 A1* | 4/2018 | Osotio | G06N 20/00 |
| 2018/0181549 A1* | 6/2018 | Hileman | G06F 40/186 |
| 2018/0276543 A1* | 9/2018 | Parrotta, Jr. | G06N 20/10 |
| 2018/0279063 A1* | 9/2018 | Sun | G10L 21/043 |
| 2018/0300162 A1* | 10/2018 | Kotlicki | G06F 3/167 |
| 2019/0050399 A1* | 2/2019 | Cameron | G06F 16/34 |
| 2019/0212811 A1* | 7/2019 | Moncomble | A61B 5/168 |
| 2019/0258722 A1* | 8/2019 | Guo | G06N 3/0454 |
| 2019/0302708 A1* | 10/2019 | Iwane | G06N 3/006 |
| 2020/0023157 A1* | 1/2020 | Lewis | G09B 19/00 |
| 2020/0126584 A1* | 4/2020 | Huang | G10L 15/1815 |

OTHER PUBLICATIONS

Classification Definitions Class 715, Data Processing: Presentation Processing of Document, Operator Interface Processing, and Screen Saver Display Processing; Feb. 2011; 33 Pages.*

"Office Action of Taiwan Counterpart Application", dated May 1, 2020, p. 1-p. 10.

* cited by examiner

METHOD FOR DYNAMICALLY PROCESSING AND PLAYING MULTIMEDIA CONTENTS AND MULTIMEDIA PLAY APPARATUS

CROSS-REFERENCE TO RELATED APPLICATION

This application claims the priority benefit of Taiwan application serial no. 108119190, filed on Jun. 3, 2019. The entirety of the above-mentioned patent application is hereby incorporated by reference herein and made a part of this specification.

BACKGROUND

Technical Field

The disclosure relates to a method and an apparatus for playing multimedia contents, and in particular to a method for dynamically processing and playing multimedia contents and multimedia play apparatus.

Description of Related Art

Traditionally, a speaker stores a slide of an electronic presentation in a file before a speech. A play of the electronic presentation is static and follows a preset order. A traditional electronic presentation cannot respond to a scenario (such as an emotion of audience, an intention, or a limit of speech time) through updating a slide, nor dynamically add, delete or re-arrange a slide during the speech. Therefore, the traditional electronic presentation lacks flexible adjustment during the play.

SUMMARY

The disclosure provides a method for dynamically processing and playing multimedia contents, which may dynamically process and arrange a play order of a multimedia content based on a situation.

A method for dynamically processing and playing multimedia contents of the disclosure includes following steps. A topic map is generated based on a title, wherein the topic map includes a plurality of nodes, and each of the nodes corresponds to one multimedia content, and a plurality of node groups are obtained through permutation and combination of these nodes; a target group that matches a constraint is found among these node groups; a play order of each of the nodes in the target group is determined according to at least one reward table; and one or a plurality of the multimedia contents included in the target group are processed and played according to the play order.

In an embodiment of the disclosure, the method for dynamically processing and playing multimedia contents further includes following steps. A plurality of samples are established; and a batch learning is performed to these samples based on a reinforcement learning, so as to obtain the at least one reward table corresponding to each of different scenes.

In an embodiment of the disclosure, step of generating the topic map based on the title includes following steps. A selection is performed between a plurality of subtitles and a plurality of articles in a knowledge base based on the title; and the topic map is established with one or more of the selected subtitles, one or more of the selected articles and a hierarchy relationship thereof.

In an embodiment of the disclosure, step of finding out the topic group that matches the constraint among these node groups includes following steps. The plurality of node groups are filtered based on the constraint; a deep semantic similarity model is used to calculate a semantic score of each of the nodes included by the topic map; and a Bayesian optimization algorithm is used to find out the target group according to the semantic score of each node included by each of the filtered node groups.

In an embodiment of the disclosure, step of processing and playing the multimedia content included by the target group according to the play order further includes following steps. Another node group is selected as the target group when a readjustment instruction is received during a process of processing and playing the multimedia content; another play order of each node in the target group is re-determined according to the reward table; and one or a plurality of the multimedia contents included by the target group are processed and played according to another play order.

In an embodiment of the disclosure, the method for dynamically processing and playing multimedia contents further includes following steps. The readjustment instruction is issued every other period of time or when a user instruction is received during the process of processing and playing the multimedia content.

In an embodiment of the disclosure, the readjustment instruction includes another constraint. Step of selecting the another node group as the target group includes following steps. Among the node groups comprising the nodes corresponding to the multimedia content that is not played yet, the node groups are filtered based on another constraint; and a Bayesian optimization algorithm is used to find out the another node group as the target group according a semantic score of each node included by each of the filtered node groups.

In an embodiment of the disclosure, the constraint includes at least one of a time constraint or an emotion constraint.

In an embodiment of the disclosure, the method for dynamically processing and playing multimedia contents further includes following steps. A plurality of emotional features of a plurality of live audience are collected; and these emotional features are analyzed to determine the emotion constraint.

In an embodiment of the disclosure, the method for dynamically processing and playing multimedia contents further includes following steps. When a readjustment instruction is received, a remaining time is calculated, and the remaining time is served as the time constraint.

A multimedia play apparatus of the disclosure includes a processor and a storage apparatus. The storage apparatus is coupled to the processor and stores a plurality of code segments, wherein these code segments are executed by the processor after being installed, so as to implement a method for dynamically processing and playing multimedia contents. The processor generates a topic map based on a title, wherein the topic map includes a plurality of nodes; each of the nodes corresponds to one of multimedia contents, and a plurality of node groups are obtained through permutation and combination of these nodes. The processor finds out a target group that matches a constraint among these node groups. The processor determines a play order of each node in the target group according to at least one reward table. The processor processes and plays one or a plurality of the multimedia contents included by the target group according to the play order.

Based on the above, the disclosure may dynamically process as well as adjust and play multimedia contents, and rearrange a play order of the multimedia contents during a playing period.

In order to make the features and advantages of the disclosure mentioned above more understandable, embodiments will be described in detail below with reference to the accompanying drawings.

DESCRIPTION OF THE EMBODIMENTS

Figure 1:
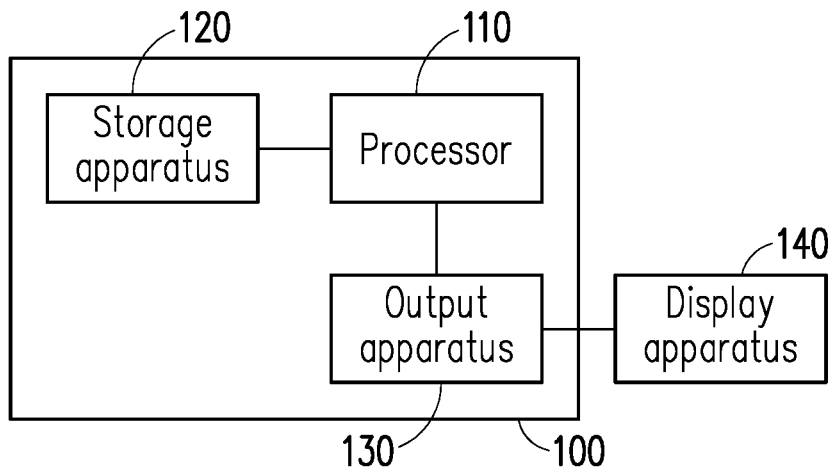
FIG. 1 is a block diagram of a multimedia play apparatus according to an embodiment of the disclosure.

FIG. 1 is a block diagram of a multimedia play apparatus according to an embodiment of the disclosure. Please refer to FIG. 1. A multimedia play apparatus 100 is an electronic apparatus having an arithmetic capability. For example, the multimedia play apparatus 100 may be a laptop computer, a tablet computer, a smart phone, a smart glasses, a smart camera, a desktop computer, a server, and so on.

In the present embodiment, the multimedia play apparatus 100 is externally connected to a display apparatus 140. The display apparatus 140 may be, for example, a projector apparatus or a giant display and so on. A method for dynamically processing and playing multimedia contents is executed through the multimedia play apparatus 100 to determine a play order of a multimedia content on the display apparatus 140 and to generate a new multimedia content or a multimedia file. Herein, the description of "process" means that the multimedia play apparatus 100 convert the multimedia content into a playable file. For example, a process is performed to the multimedia content to obtain a slide or other files that are appropriate for viewing. The multimedia play apparatus 100 includes a processor 110, a storage apparatus 120, and an output apparatus 130. The processor 110 is coupled to the storage apparatus 120 and the output apparatus 130.

The processor 110 is, for example, a central processing unit (CPU), a graphic processing unit (GPU), a physics processing unit (PPU), a microprocessor, an embedded controlling chip, a digital signal processor (DSP), an application specific integrated circuits (ASIC), or other similar apparatuses.

The storage apparatus 120 is, for example, any types of a fixed or a movable random access memory (RAM), a read-only memory (ROM), a flash memory, a secure digital memory card (SD), a hard drive or other similar apparatuses or a combination of these apparatuses. A plurality of code segments are stored in the storage apparatus 120; after the plurality of code segments are installed, the processor 110 executes the plurality of code segments to implement each step of the method for dynamic processing and playing multimedia contents.

The output apparatus 130 is, for example, a communication chip such as a network card and a Wi-Fi module, or a transmission interface circuit of the connection interface specification such as a video graphics array (VGA), a high definition multimedia interface (HDMI), or a display port (DP). The output apparatus 130 is used to display the multimedia content on the externally connected display apparatus 140.

The multimedia display apparatus 100 is used to process the multimedia content, to determine the play order and the multimedia content, and to generate the multimedia file that is desired to be played. The multimedia file is, for example, an electric slide, a video, an audio, an image, a word and so on. For example, an application program is installed in the storage apparatus 120, and the application program is in charge of processing and arranging the multimedia content and generates multimedia file that is desired to be played.

In addition, the multimedia play apparatus 100 may further include a built-in display that is not drawn, which is, for example, an imaging apparatus in a pair of smart glasses, a screen of a laptop computer, a screen of a tablet computer and so on. All of the multimedia contents included in a current play are shown in the built-in display, and only the selected and arranged multimedia contents are shown in the external display apparatus 140. Also, the multimedia play apparatus 100 further includes an image capturing apparatus and/or an audio receiving apparatus that are not drawn, so as to collect emotional features of live audience to determine the process and play order of the multimedia contents according to the emotions of the audience.

Figure 2:
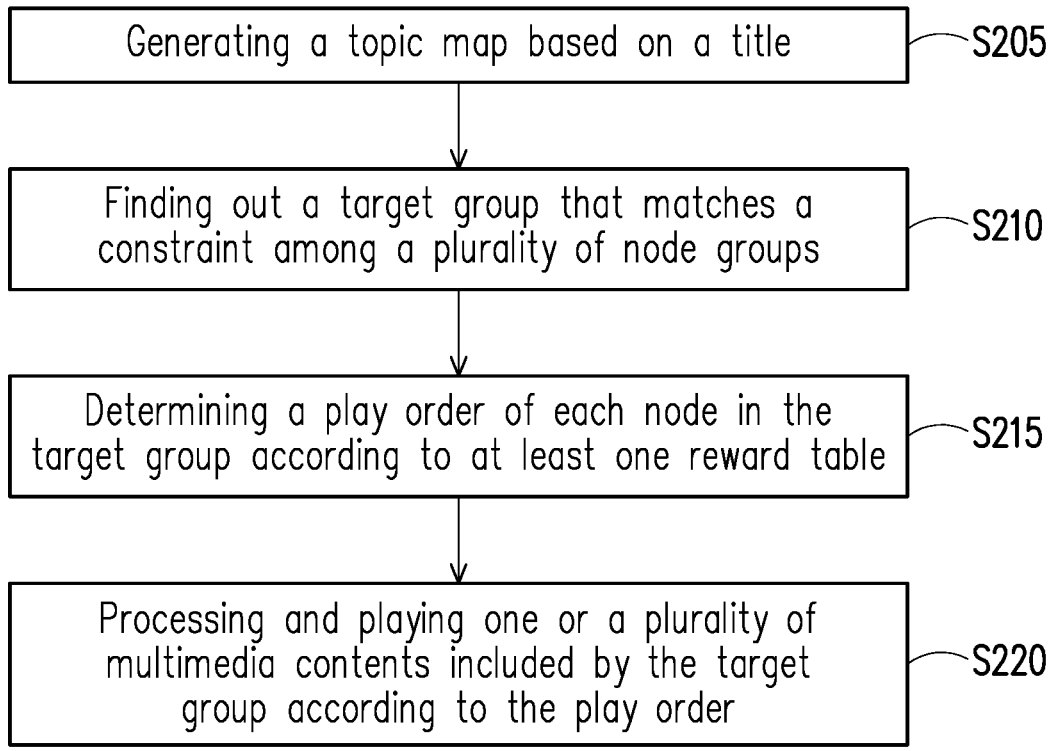
FIG. 2 is a method flow chart of dynamically processing and playing multimedia contents according to an embodiment of the disclosure.

Examples are raised as follows to explain each step of the method of how to dynamically process and to play multimedia contents. FIG. 2 is a method flow chart of dynamically processing and playing multimedia contents according to an embodiment of the disclosure. Please refer to FIG. 2. In a step S205, a knowledge base is searched based on a received title, so as to generate a topic map. Herein, the knowledge base may be stored in the storage apparatus 120. In other embodiments, the knowledge based may also be stored in a remote server. In an embodiment, a user may input a title that is desired to be played through the multimedia play apparatus 100, and the processor 110 searches the knowledge base based on the title. The topic map includes a plurality of nodes, and a node corresponds to a title, a subtitle, an article, or a multimedia content, and a plurality of node groups are obtained through permutation and combination of these nodes.

The topic map is a standard performing representation and interaction to a knowledge, emphasizing a searchability of a message, and combing advantages of fields such as traditional index, search engine, artificial intelligence, which may effectively organize knowledges in order to search, to deduce, and to solve problems brought a large number of disorder messages. The topic map is like a book subject index of a book. A main purpose of the subject index is to list out each topic and a subtopic in a single topic in a certain knowledge domain, and to build a reference relationship between a see and a see also, connecting topics having relations together. The topic map is a Semantic Web technology that is similar to a resource description framework (RDF).

The knowledge base is, for example, a Semantic Web database. A plurality of short character strings and a plurality of long character strings are included in the knowledge base.

The short character strings are, for example, a title and a subtitle. The long character strings are, for example, an article and so on. A plurality of subtitles and/or articles are selected from the knowledge base based on the received title; then, the topic map is established with one or a plurality of selected subtitles, one or a plurality of selected articles and the hierarchy relationship thereof. During the process of searching downward layer by layer, the search would not continue downward to the next layer after an article is found.

Figure 5:
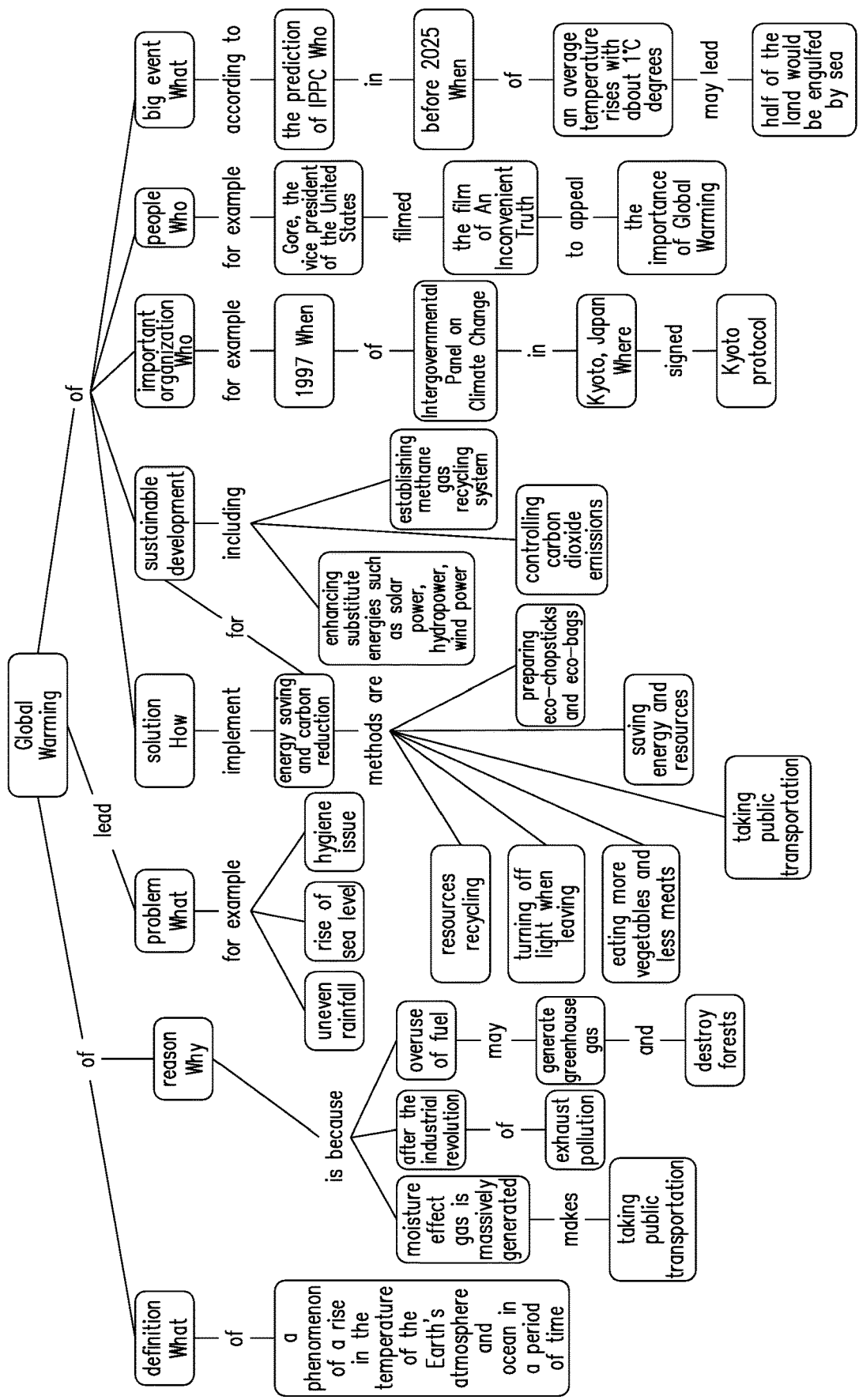
FIG. 5 is a schematic view of a topic map according to an embodiment of the disclosure.

Examples of manufacturing an electric slide is raised as follows to explain the establishment of a topic map. FIG. 5 is a schematic view of a topic map according to an embodiment of the disclosure. In FIG. 5, "global warming" is used as a title, and a plurality of subtitles, articles and a hierarchy relationship between these subtitles and articles included under the title of "global warming" may be obtained through searching the knowledge base, so that an entire topic map is generated.

Further, in a step S210, a target group that matches a constraint is found among a plurality of node groups. The target group is a node group having the most preferable objective function in the matched constraint. Scores obtained by the objective function are used to judge whether each of these node groups is the most preferable node group. Specifically, a deep semantic similarity model (DSSM) is used firstly to calculate a semantic score of each node included by the topic map. The main purpose of the DSSM lies on calculating a similarity of a semantic space. Due to such a feature, the DSSM may be used in various ways to solve various tasks of practical works such as machine translation, search engine, image caption generation, communication system, context named entities recognition and so on.

In addition, before calculating the semantic score, the node groups may be further filtered based on the constraint. In other words, the node groups are filtered based on the constraint first, and then the DSSM is used to calculate the semantic score of each filtered node in the topic map. In addition, in other embodiments, the DSSM may be used first to calculate the semantic score of each node included by the topic map and then the node groups are filtered based on the constraint. The constraint may be, for example, a longest time that is desired to be played this time. Meanwhile, the Bayesian optimization algorithm is used to find out the target group according to the semantic score of each node included by each of the filtered node groups. In another embodiment, a Constrained Bayesian optimization algorithm, for example, is used to find out the target group and the node is filtered based on the constraint such as a speech time constraint and an audience emotion constraint.

Figure 3:
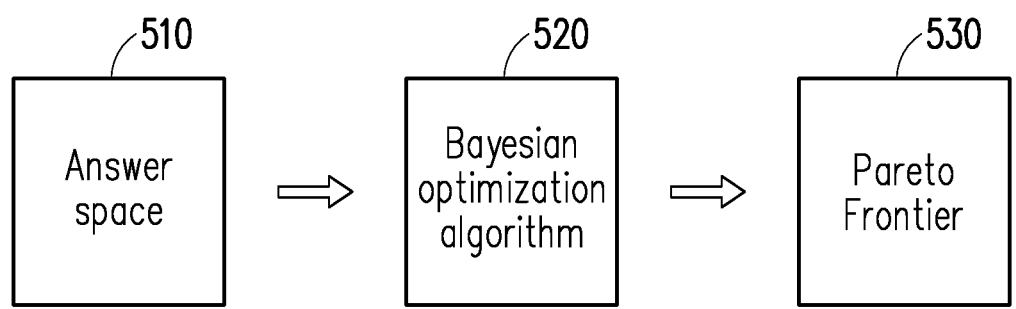
FIG. 3 is a schematic view of a process of a Bayesian optimization algorithm according to an embodiment of the disclosure.

FIG. 3 is a schematic view of a process of a Bayesian optimization algorithm according to an embodiment of the disclosure. Please refer to FIG. 3. A plurality of node groups obtained based on permutation and combination of a plurality of nodes in the topic map are put into an answer space 510. Further, a Bayesian optimization algorithm 520 is executed.

Herein, the Bayesian optimization algorithm 520 is executed based on a constraint and an objective function. The constraint is, for example, a time constraint or an emotion constraint, and the objective function uses the semantic score. In other words, the Bayesian optimization algorithm 520 uses the time constraint to constrain a presentation time of a multimedia content, using the emotion constraint to constrain a type of a multimedia content that is desired to be played. In addition, the score obtained by the objective function is used to judge whether the node group is the most preferable one.

Afterward, a Pareto Frontier 530 is used to obtain a plurality of n sets of the most preferable node groups, and the most suitable solution is picked up among the n sets of the most preferable node groups as the target group. For example, a user may select one of them depending on the situation, or select the one with the highest total semantic score automatically, and the disclosure is not limited hereto.

Before a play is performed, the Bayesian optimization algorithm 520 uses the semantic score of each node among the node groups as an objective function, and the Bayesian optimization algorithm 520 is executed based on the remaining time constraint and/or emotion constraint. Afterward, during the play, the Bayesian optimization algorithm 520 is executed repeatedly based on the current remaining time constraint and/or current emotion constrain (such as current emotions of audiences).

Please return to FIG. 2. In a step S215, a play order of each node in the target group is determined according to at least one reward table. Further, the play order of each node in the target group is determined according to one or more reward tables obtained through a reinforcement learning based on a depth first search. In the present embodiment, a generative adversarial network (GAN) is used to establish a plurality of samples. GAN includes two neural networks such as a discriminator and a generator. A sample is generated by the generator, and an authenticity of the sample is examined by the discriminator. Further, a batch learning is performed based on the reinforcement learning, so as to obtain the reward table.

Herein, the reinforcement learning is, for example, a Q-learning, and the reward table is, for example, a Q-table. A reward value obtained by the Q-learning may be stored in the Q-table. The reinforcement learning involves an agent, a set of states and a set of actions under each state. Through performing an action, the agent may transfer from one state to another state. When performing an action under a specific state, the agent may obtain one reward value.

GAN generates a plurality of samples for some specific scenes, and makes the samples as input of the Q-learning to train the Q-table. The Q-table is as follows. However, the following Q-table is just an example for explanation. In a practical application. a dimension and a reward value thereof of the Q-table may be determined depending on a situation.

| | Action | | | | | |
|---|---|---|---|---|---|---|
| State | 0 | 1 | 2 | 3 | 4 | 5 |
| 0 | −1 | −1 | −1 | −1 | 0 | −1 |
| 1 | −1 | −1 | −1 | 0 | −1 | 100 |
| 2 | −1 | −1 | −1 | 0 | −1 | −1 |
| 3 | −1 | 0 | 0 | −1 | 0 | −1 |
| 4 | 0 | −1 | −1 | 0 | −1 | 100 |
| 5 | −1 | 0 | −1 | −1 | 0 | 100 |

The reward value to each action under each state is recorded in the Q-table. Each node may correspond to one reward table. In other words, after determining a node that is desired to be played at the moment, next node that is desired to be played would be determined through inquiring the reward table. In another embodiment, the multimedia play apparatus 100 determines the play order of each node in the target group according to the depth first search and by referring to the plurality of reward tables obtained through the reinforcement learning. The reward value of Q-table may be formed through being trained by inputting different sample according to different scenes. For example, in a scene of a technology conference, the Q-table is trained according to a scene that may lead an emotion to "favor"; therefore, the reward value of the Q-table corresponded by the technology conference has accumulated a large amount of experience that lead to the emotion of "favor". For another example, in a scene of an lecture of a learning center, the Q-table is trained according to a scene that may lead an emotion to "happiness"; in a scene of a memorial service, the Q-table is trained according to a scene that may lead an emotion to "melancholy"; in a scene of a condemnation gathering, the Q-table is trained according to a scene that may lead an emotion to "anger".

For example, in a plurality of states of the Q-table, a state corresponding to a node of "global warming" is found, and a node corresponded by the highest reward value in the state is found as a next node that is desired to be played. Each node may find a corresponding state in the Q-table.

After the reward table is used to determine the play order of each node, in a step S220, one or a plurality of multimedia contents included by the target group is processed and played according to the play order, and a multimedia file that is desired to be played is generated.

In addition, when a readjustment instruction is received during the process of processing and playing multimedia contents, another node group is selected as the target group. For example, when a user instruction is received during the process of processing and playing multimedia contents, the readjustment instruction is issued. Or, during the process of processing and playing the multimedia contents, the readjustment instruction is issued by the application program every other period of time. The readjustment instruction includes the constraint. When the readjustment instruction is received, among the node groups comprising the nodes corresponding to the multimedia contents that has not been played, the node groups are filtered based on the constraint. Afterward, the Bayesian optimization algorithm is used to find out another node group as the target group according to the semantic score of each node included by each of the filtered node groups.

Herein, the remaining time from the previously set longest time cutoff that is desired to be played may be calculated, and another node group that matches the remaining time may be rediscovered with the remaining time as the time constraint. In addition, sensors such as an image capturing apparatus and/or an audio receiving apparatus may be used to collect emotional features of live audiences, and the emotion constraint is determined through analyzing these emotional features. Herein, the sensor is coupled to the processor 110 to rediscover another node group that matches the emotion constraint. In addition, the another node group is used as the target group again.

Afterward, another play order of each node in the target group is re-determined according to the reward table, and the multimedia contents included by the target group is processed and played according to another play order, and another multimedia file is generated.

Figure 4:
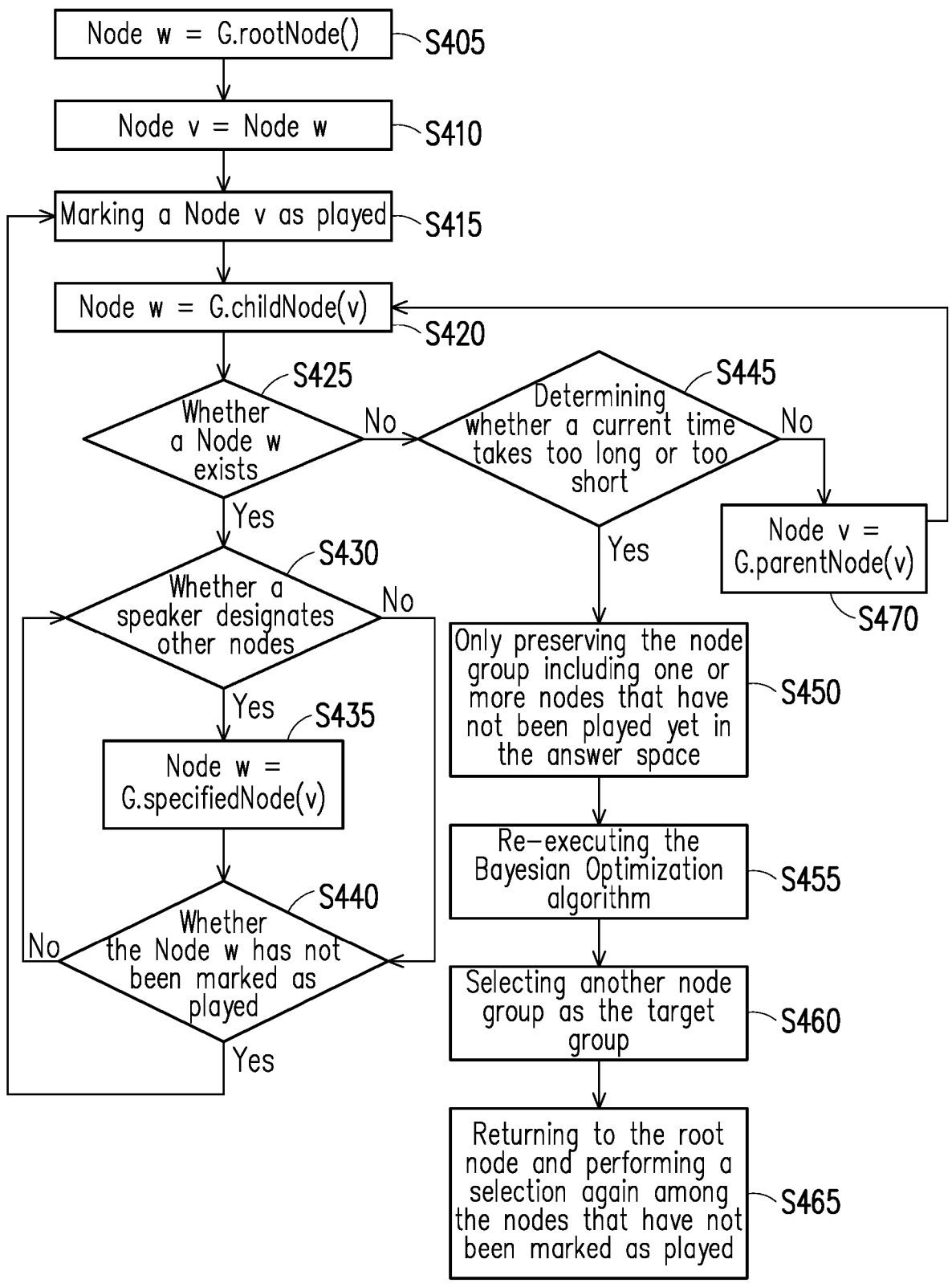
FIG. 4 is a flow chart of a method of determining a play order according to an embodiment of the disclosure.

An electric presentation as follows is raised as an example to explain how to determine a play order. FIG. 4 is a flow chart of a method of determining a play order according to an embodiment of the disclosure. The play order of other nodes may be determined according to the reward table starting from a root node after the target group is determined. Please refer to FIG. 4, in a step S405, a root node "G.rootNode( )" is selected and is set as a Node w.

Further, in a step S410, the Node w is set as a Node v. In addition, in a step S415, the Node v is marked as played. In other words, the play order of the root node is set as t "1", and the root node is set as played.

Afterward, in a step S420, one of child nodes "G.childNode(v)" having the largest reward value is found among the child nodes of the Node v according to the reward table, and is set as the Node w. Afterward, in a step S425, whether the Node w exists or not is judged, which means that whether the Node v has one or more child nodes is judged. If the Node w exists, a step S430 is executed; if the Node w does not exist, a step S445 is executed.

In the step S430, whether a speaker designates other nodes is judged. If the speaker designates other node, the designated node "G.specfiedNode(v)" is set as the Node w. Further, in a step S440, whether the Node w has not been marked as played is judged. If the speaker has not designated other node, as shown in the step S440, whether the Node w has not been marked as played is judged. In the step S440, if the Node w has has not been marked as played, the process returns to the step S415. In the step S440, if the Node w has been marked as played, the process returns to the step S430. In other words, during the process of playing, the speaker is allowed to determine a content that is desired to be played. If the node designated by the speaker has been played, the speaker would be required to re-designate other node that has not been played yet.

In the step S425, if the Node w does not exist, which means that Node v does not have the child node, whether the current time takes too long or too short is judged in the step S455. In other words, in the present embodiment, it is set that when it is detected that the currently playing node does not have a child node, the application program may automatically judge whether the current time takes too long or too short, which means calculating the remaining time.

If the time has not taken too long or too short; then as shown in step S470, a parent node "G.parentNode(v)" of the Node v is set as the Node v, and the process returns to the step S420. In other words, the parent node of the Node v is returned to rediscovers another child node of the Node v. If the time takes too long or too short, in the step S450, only the node group including one or more nodes that have not been played is preserved in the answer space. In addition, in the step S455, the Bayesian optimization algorithm is re-executed. In the step S460, another node group is selected as the target group. Afterward, in the step S465, in the new target group, the process returns to the root node to perform a selection again among the nodes that have not been marked as played.

Figure 6:
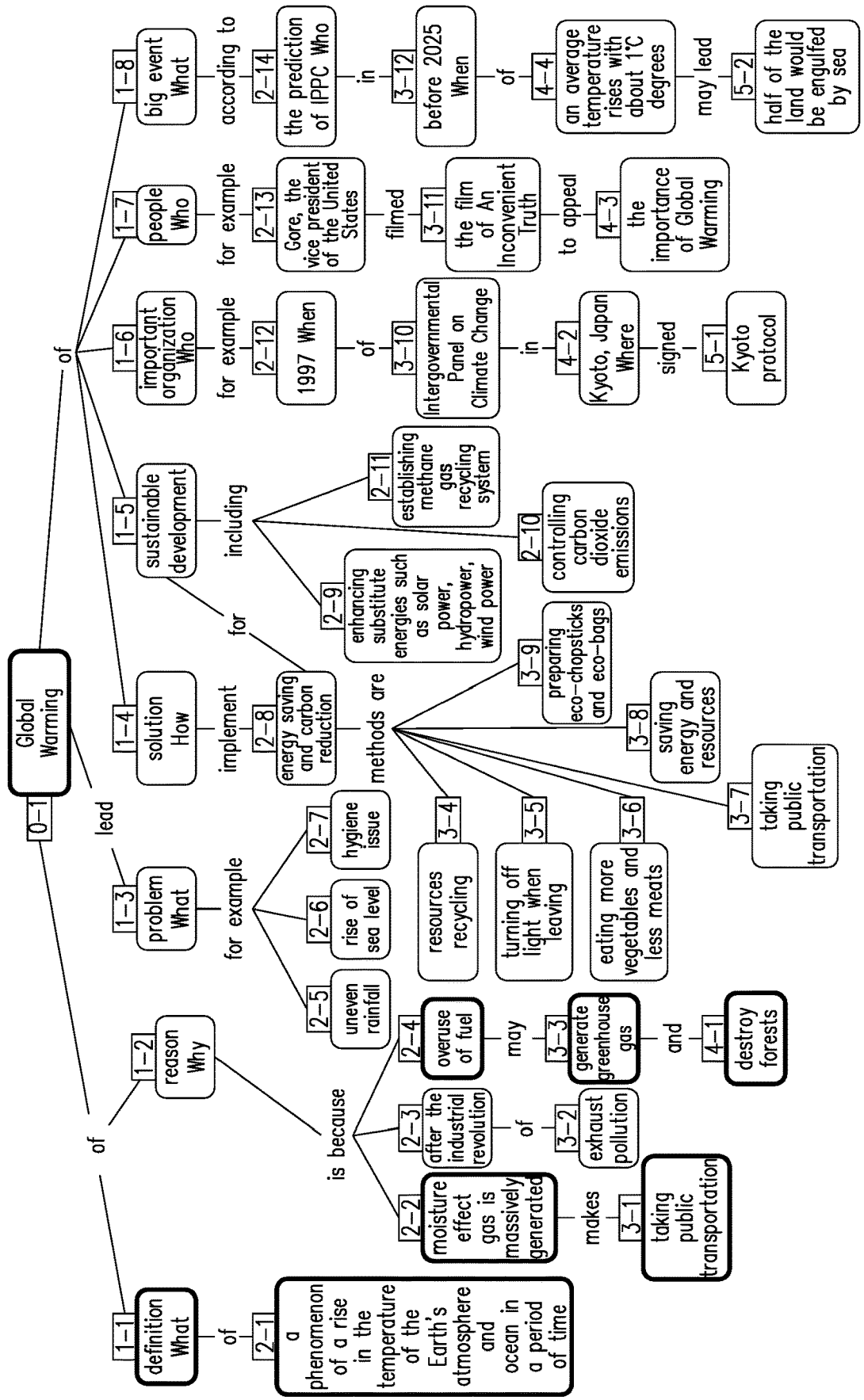
FIG. 6 is a schematic view used to explain a target group according to an embodiment of the disclosure.
Figure 7:
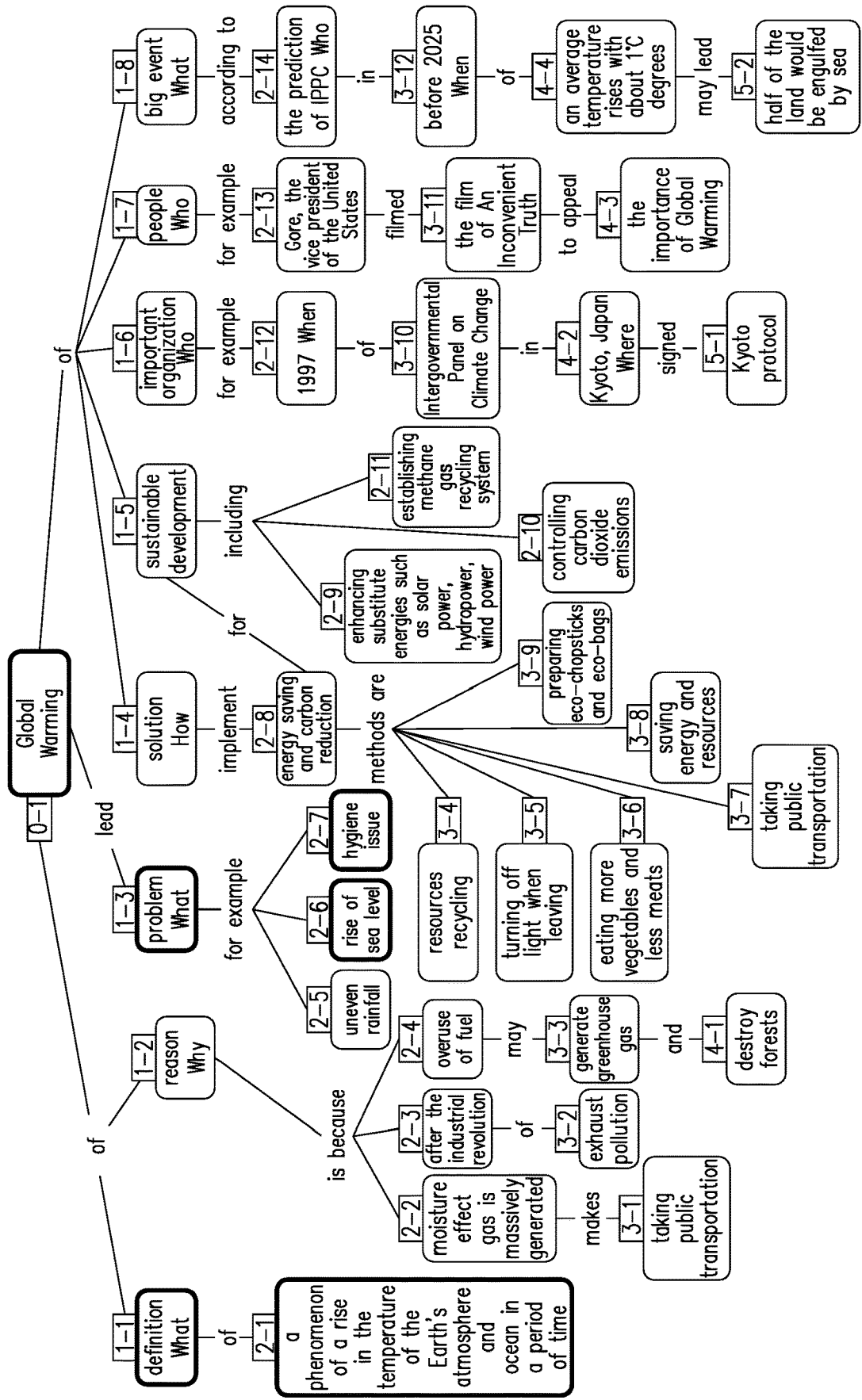
FIG. 7 is a schematic view used to explain another target group according to an embodiment of the disclosure.

The following description would be made as follows with FIG. 6 to FIG. 7. FIG. 6 is a schematic view used to explain a target group according to an embodiment of the disclosure. FIG. 7 is a schematic view used to explain another target group according to an embodiment of the disclosure. In FIG. 6 and FIG. 7, each node in the topic map is assigned a number respectively to facilitate the following description.

Firstly, the target group shown in FIG. 6 is raised as an example to explain the following description. In FIG. 6, the target group includes a node 0-1, a node 1-1, a node 1-2, a node 2-1, a node 2-2, a node 2-4, a node 3-1, a node 3-3, and a node 4-1.

The processing and playing are started to be performed from a multimedia content corresponding to the root node, which is the node 0-1. In addition, the node 0-1 is marked as played. In the target group shown in FIG. 6, the child nodes in the next layer of the node 0-1 include the node 1-1 and the node 1-2. Meanwhile, one node with a larger reward value is selected from the node 1-1 and the node 1-2 according to the corresponding reward table. Herein, the reward value of the node 1-1 is assumed to be larger than the reward value of the node 1-2. Therefore, the multimedia content corresponding to the node 1-1 is selected to process and play, and the node 1-1 is marked as played. The child node in the next layer of the node 1-1 only includes the node 2-1, and the multimedia content corresponding to the node 2-1 is selected to process and play, and the node 2-1 is marked as played.

Since the node 2-1 does not have the child node in the next layer, the process returns to the parent node of the node 2-1, which is the node 1-1. The only child node of the node 1-1 has been marked as played, then the process returns to the parent node of the node 1-1, which is the node 0-1. At the moment, since the node 1-2 is the only one child node left in the next layer of the node 0-1 that has not been marked as played, the multimedia content corresponding to the node 1-2 is selected to process and play, and the node 1-2 is marked as played.

Afterward, in the child nodes of the next layer of the node 1-2, one child node with the larger reward value is selected according to the corresponded reward table. Herein, the reward value of the node 2-2 is assumed to be larger than the reward value of the node 2-4; therefore, the multimedia content corresponding to the node 2-2 is selected to process and play, and the node 2-2 is marked as played. The child node in the next layer of the node 2-2 only includes the node 3-1, and therefore the multimedia content corresponding to the node 3-1 is selected to process and play, and the node 3-1 is marked as played.

Further, since the node 3-1 does not have the child node in the next layer, the process returns to the parent node, which is the node 2-2. Since the only child node of the node 2-2 has been marked as played, and the process returns to the parent node, which is the node 1-2. At the moment, since the node 2-4 is the only one child node left in the next layer of the node 1-2 that has not been marked as played, the multimedia content corresponding to the node 2-4 is selected to process and play, and the node 2-4 is marked as played.

The child node in the next layer of the node 2-4 only includes the node 3-3; therefore, the multimedia content corresponding to the node 3-3 is selected to process and play, and the node 3-3 is marked as played. Further, the multimedia content corresponding to the node 4-1 is continued to be selected to process and play, and the node 4-1 is marked as played.

Thus, the play order of the target group shown by FIG. 6 is as follows: the node 0-1, the node 1-1, the node 2-1, the node 1-2, the node 2-2, the node 3-1, the node 2-4, the node 3-3, and the node 4-1.

During the playing process, if it is judged that the current time takes too long or too short, another node group is re-selected as the target the group. For example, for FIG. 4, when it is detected that the currently playing node does not have the child node, the application program would automatically judge whether the current time takes too long or too short; therefore, in FIG. 6, since the node 2-1 does not have the child node in the next layer, whether the current time takes too long or too short may be judged automatically at the moment. In another embodiment, emotions of live audience may be further judged.

In other words, whether the time taken for playing the previous multimedia contents is early or delayed is confirmed. If the time is early or delayed, the application program may readjust one or more multimedia contents to be processed and played and the play order thereof within the remaining time. As shown from the step S450 to the step S460 in FIG. 4, another node group is re-selected as the target group.

Another target group shown in FIG. 7 includes a node 0-1, a node 1-1, a node 1-3, a node 2-1, a node 2-6 and a node 2-7. In a new target group, the process returns to a root node, which is the node 0-1, and a selection is performed again among the nodes that have not been marked as played, which means that the multimedia content corresponding to the node 1-3 is selected to process and play, and the node 1-3 is marked as played. Further, the multimedia content corresponding to the node 2-6 is selected according to the corresponding reward table to process and play, and the node 2-6 is marked as played.

Further, since the node 2-6 does not have the child node in the next layer, the process returns to the parent node, which is the node 1-3. Since the node 2-7 is the only one child node left in the next layer of the node 1-3 that has not been marked as played, the multimedia content corresponding to the node 2-7 is selected to process and play, and the node 2-7 is marked as played.

For FIG. 6 and FIG. 7, if the current time is found taking too long or too short after the multimedia content corresponding to the node 2-1 is played so that the multimedia content for processing and playing afterward and the play order thereof need to be readjusted, the processing and playing order of the multimedia contents are the node 0-1, the node 1-1, the node 2-1, the node 1-3, the node 2-6, and the node 2-7.

In other words, when the remaining time of the speaker is too short or too long, the application program may automatically rearrange the following process and play order of the multimedia contents that have not been played according to the remaining time, so as to keep the original arranged play time from playing overtime or ending early.

Also, the multimedia content that is desired to be processed and played and the play order thereof may be readjusted according to the emotions of live audience. For example, during the remaining time of 5 minutes, a detected emotion constraint is "anger", then the multimedia content to be processed and the play order thereof would be re-determined according to the abovementioned methods. For example, a node group that don't need to think much is selected. Or, in the remaining time of 10 minutes, a detected emotion constraint is "happiness", then the multimedia content to be processed and the play order thereof would be re-determined according to the abovementioned methods. For example, a node group that requires deep consideration is selected.

In addition, emotions (E) obtained by sensors such as an image capturing apparatus and/or an audio receiving apparatus may include delight (D), anger (A), melancholy (M), happiness (H), and no emotion (P). Assuming that a mapping function is $F: E \rightarrow C$, then an emotion E is converted as an emotion constraint C, which means that $C=F(E)=F(D, A, M, H, P)$. Practically, the mapping function F may be implemented with a structured classification to train the structured classification this model of what the emotion constrain C is when the emotions of audience is E.

For example, a structured support vector machine may be used to predict a structured object. The structured object may include {ConstraintFunction_1, ConstraintFunction_2, . . . , ConstraintFunction_n}, wherein the ConstraintFunction_1 to ConstraintFunction_n are the constraint used to constrain and select the node group left in the Pareto Frontier 530. Assuming that the ConstraintFunction_1 can only send back "TRUE" for the node group that deals with "melancholy", then the ConstraintFunction_1 would only send back "FALSE" for other node groups; assuming that ConstraintFunction_2 can only send back "TRUE" for the node group that deals with "anger", then the ConstraintFunction_2 would only send back "FALSE" for other node groups. When the melancholy/anger is judged, only the node groups filtered by the ConstraintFunction_1 and ConstraintFunction_2 may stay in the Pareto Frontier 530.

In addition, under a situation that the number of audience is large and emotions of each one may not be the same, some key persons may be set herein (such as persons with purchasing decision right or department supervisors), and weights of the key persons may be increased when the analysis is being performed. For example, E=(W1*E1+ W2*E2+ . . . +Wn*En)/n, wherein n is the number of the audience, W1 to Wn represent the weight, and E1 to En represent emotions of different audiences.

Through the methods mentioned above, the disclosure may be applied in different scenes. For example, a speech content may be adjusted automatically for the situation in which the emotion is favor during a technology conference. The speech content may be adjusted automatically for the situation in which the emotion is happiness during a learning center lecture. The speech content may be adjusted automatically for the situation in which the emotion is melancholy during a memorial service. The speech content may be adjusted automatically for the situation in which the emotion is anger during a condemnation gathering.

For example, the speaker may fix the multimedia play apparatus 100 on a podium, and face the image capturing apparatus and audio receiving apparatus toward the audience. Further the speaker directly inputs a title of a speech this time; thus, the application program in the multimedia play apparatus 100 may display all the slides and speech order on a built-in display, and display the slides corresponding to the node groups that are practically to be played on the external display apparatus 140. For example, a method of flickering on the built-in display may be used to remind the speaker the next slide of the speech. If the speaker disagrees, the speaker may decide the next slide for the speech by him or herself through the built-in display. For example, if the built-in display is a touch screen, the speaker may perform a selection on the built-on display. At the same time, the application program may readjust the following speech content according to the selection of the speaker.

In addition, each slide has the pre-calculated time thereof during the speech. If the speech time of the slides is early or delayed, the application program may also readjust the following speech content according to the remaining time, so as to control the speech time to end within a predetermined time. In addition, a plurality of emotional features of live audience are collected through the image capturing apparatus and the audio receiving apparatus to allow the application program to readjust the following speech content when detecting changes of the emotions.

Based on the above, the disclosure may dynamically process the multimedia contents and rearrange orders during the play, and dynamically generates multimedia files. Therefore, the speaker may dynamically update, add, or remove the slides and rearrange the orders of the slides during the speech. In addition, any speaker may present a speech in the following few minutes without spending a massive amount of time to prepare for speech materials. In addition, in another embodiment, an augmented reality (AR) is combine to facilitate a guiding, and to propose a next move for the most preferable knowledge base of Artificial Intelligence (AI).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for dynamically processing and playing multimedia contents, comprising:
   generating a topic map based on a title, wherein the topic map comprises a plurality of nodes, and each of the plurality of nodes corresponds to a multimedia content, and a plurality of node groups are obtained through permutation and combination of the plurality of nodes;
   determining one of the plurality of node groups that matches a constraint as a target group;
   determining a play order of each node and a plurality of child nodes in the target group according to at least one reward table;
   processing and playing one or a plurality of multimedia contents comprised by the target group according to the play order;
   wherein the constraint comprises a time constraint, and the time constraint constrains a presentation time of the multimedia content; and
   determining a currently playing node of the multimedia content comprises no child nodes;
   wherein in response to the currently playing node of the multimedia content comprises no child nodes, the method for dynamically processing and playing multimedia contents further comprises:
   judging a current time of the multimedia content currently playing is greater than a first threshold value or less than a second threshold value;
   calculating a remaining time;
   making the remaining time as the time constraint.

2. The method for dynamically processing and playing multimedia contents according to claim 1, further comprising:
   establishing a plurality of samples; and
   obtaining the at least one reward table corresponding to different scenes by performing a batch learning to the plurality of samples based on a reinforcement learning.

3. The method for dynamically processing and playing multimedia contents according to claim 1, wherein generating the topic map based on the title comprises:
   performing a selection from a plurality of subtitles and a plurality of articles in a knowledge base based on the title; and
   establishing the topic map with one or a plurality of selected subtitles, one or a plurality of selected articles and a hierarchy relationship thereof.

4. The method for dynamically processing and playing multimedia contents according to claim 1, wherein determining one of the plurality of node groups that matches the constraint as the target group comprises:
   filtering the plurality of node groups based on the constraint;
   using a deep semantic similarity model (DSSM) to calculate a semantic score of each of the plurality of nodes comprised by the topic map; and using a Bayesian optimization algorithm to determine the target group according to the semantic score of each node comprised by each of a plurality of filtered node groups.

5. The method for dynamically processing and playing multimedia contents according to claim 1, wherein processing and playing the multimedia content comprised by the target group according to the play order further comprises:
selecting a new group node as the target group after a readjustment instruction is received during a process of processing and playing the multimedia content;
re-determining a new play order of each node in the target group according to the at least one reward table; and
processing and playing one or a plurality of multimedia contents comprised by the target group according to the new play order.

6. The method for dynamically processing and playing multimedia contents according to claim 5, further comprising:
issuing the readjustment instruction after a user instruction is received or every other period of time during the process of processing and playing the multimedia content.

7. The method for dynamically processing and playing multimedia contents according to claim 5, wherein the readjustment instruction comprises a new constraint,
selecting the new node group as the target group comprises:
filtering the plurality of node groups based on the new constraint from one or a plurality of the node groups comprising one or a plurality of the nodes corresponding to the multimedia content that has not been played; and
using a Bayesian optimization algorithm to determine the new node group as the target group according to a semantic score of each node comprised by each of the plurality of filtered node groups.

8. The method for dynamically processing and playing multimedia contents according to claim 1, wherein the constraint comprises an emotion constraint, and the method further comprises:
collecting a plurality of emotional features of a live audience; and
analyzing the plurality of emotional features to determine the emotion constraint.

9. The method for dynamically processing and playing multimedia contents according to claim 1, further comprising:
calculating the remaining time after a readjustment instruction is received, and making the remaining time the time constraint.

10. A multimedia play apparatus comprising:
a processor; and
a storage apparatus coupled to the processor and configured to store a plurality of code segments, wherein after the plurality of code segments are installed, the processor executes the plurality of code segments to implement the method for dynamically processing and playing multimedia contents, wherein
the processor generates a topic map based on a title, wherein the topic map comprises a plurality of nodes, and each of the plurality of nodes corresponds a multimedia content, and a plurality of node groups are obtained through permutation and combination of the plurality of nodes,
the processor determines one of the plurality of node groups that matches a constraint as a target group,
the processor determines a play order of each node and a plurality of child nodes in the target group according to at least one reward table,
the processor processes and plays one or a plurality of multimedia contents comprised by the target group according to the play order,
wherein the constraint comprises a time constraint, and the time constraint constrains a presentation time of the multimedia content,
wherein in response to a currently playing node of the multimedia content comprises no child nodes, the processor judges a current time of the multimedia content currently playing is greater than a first threshold value or less than a second threshold value, calculates a remaining time, and makes the remaining time the time constraint.

11. The multimedia play apparatus according to claim 10, wherein the processor establishes a plurality of samples and obtains the at least one reward table corresponding to each of different scenes by performing a batch learning to the plurality of samples based on a reinforcement learning.

12. The multimedia play apparatus according to claim 10, wherein the processor performs a selection from a plurality of subtitles and a plurality of articles in a knowledge base based on the title, and establishes the topic map with one or a plurality of selected subtitles, one or a plurality of selected articles and a hierarchy relationship thereof.

13. The multimedia play apparatus according to claim 10, wherein the processor filters the plurality of node groups based on the constraint; uses a deep semantic similarity model to calculate a semantic score of each of the plurality of nodes comprised by the topic map; and uses a Bayesian optimization algorithm to determine the target group according to the semantic score of each node comprised by each of a plurality of filtered node groups.

14. The multimedia play apparatus according to claim 10, wherein the processor selects a new node group as the target group after a readjustment instruction is received during a process of processing and playing the multimedia content, re-determines a new play order of each node in the target group according to the at least one reward table, and processes and plays one or a plurality of multimedia contents comprised by the target group according to the new play order.

15. The multimedia play apparatus according to claim 14, wherein the processor issues the readjustment instruction after a user instruction is received or every other period of time during the process of processing and playing the multimedia content.

16. The multimedia play apparatus according to claim 14, wherein the readjustment instruction comprises a new constraint,
the processor filters the plurality of node groups based on the new constraint from one or a plurality of the node groups comprising one or a plurality of the nodes corresponding to the multimedia content that has not been played, and uses a Bayesian optimization algorithm to determine the new node group as the target group according to a semantic score of each node comprised by each of the plurality of filtered node groups.

17. The multimedia play apparatus according to claim 10, wherein the constraint comprises an emotion constraint, and the multimedia play apparatus further comprises:
a sensor coupled to the processor and configured to collect a plurality of emotional features of a live audience, wherein the processor analyzes the plurality of emotional features to determine the emotion constraint.

18. The multimedia play apparatus according to claim 10, wherein the processor calculates the remaining time after a readjustment instruction is received and makes the remaining time the time constraint.

* * * * *